J. P. OGDEN.
ELECTRIC SIGNALING SYSTEM FOR MOTOR VEHICLES.
APPLICATION FILED MAR. 24, 1917. RENEWED SEPT. 23, 1918.

1,284,134.

Patented Nov. 5, 1918.
3 SHEETS—SHEET 1.

Inventor
Joseph P. Ogden

J. P. OGDEN.
ELECTRIC SIGNALING SYSTEM FOR MOTOR VEHICLES.
APPLICATION FILED MAR. 24, 1917. RENEWED SEPT. 23, 1918.

1,284,134.

Patented Nov. 5, 1918.
3 SHEETS—SHEET 2.

Inventor
Joseph P. Ogden
by Jas. H. Churchill
Atty.

UNITED STATES PATENT OFFICE.

JOSEPH P. OGDEN, OF LYNN, MASSACHUSETTS, ASSIGNOR TO NAILLIK MOTOR SIGNAL CO., OF BOSTON, MASSACHUSETTS, A CORPORATION OF MASSACHUSETTS.

ELECTRIC SIGNALING SYSTEM FOR MOTOR-VEHICLES.

1,284,134. Specification of Letters Patent. Patented Nov. 5, 1918.

Application filed March 24, 1917, Serial No. 157,249. Renewed September 23, 1918. Serial No. 255,381.

*To all whom it may concern:*

Be it known that I, JOSEPH P. OGDEN, a citizen of the United States, and a resident of Lynn, in the county of Essex and State of Massachusetts, have invented an Improvement in Electric Signaling Systems for Motor-Vehicles, of which the following description, in connection with the accompanying drawings, is a specification, like characters on the drawings representing like parts.

This invention relates to an electric signaling system for use on motor vehicles such as automobiles, motor trucks and the like, for signaling the intention of the operator of the vehicle with respect to the movement of the vehicle.

The present invention has for its object to provide the motor vehicle with an electric signaling system having signals for indicating movement of the vehicle to the right and left and provided with a plurality of circuit controllers governing said system, which are associated with a device or devices for controlling the movement of the vehicle, so that said signals are necessarily operated collectively when the device which controls the movement of the vehicle is operated.

The invention is particularly applicable to motor vehicles of the type now commonly in use in which one or more foot operated levers is or are employed to operate the clutch and foot brake of the vehicle, and in the present instance the invention is embodied in a motor vehicle having separate foot levers, one for the clutch and another for the foot brake, and circuit controllers for the signaling system are associated with said levers, so that the signaling system may be operated by the foot to operate the signals individually or collectively without operating either the clutch or brake lever and so that the operation of either the clutch or brake lever necessarily operates collectively the signals of the signaling system.

In the present instance, the signaling system is provided with a plurality of circuit controllers, herein shown as three in number, two of which are attached to the clutch lever so as to be accessible to the foot of the operator, and which are designed to individually control individual signals, and are so associated with the clutch lever as to be capable of being operated individually or collectively by the foot of the operator without operating the clutch lever and also so as to be necessarily operated collectively when the clutch lever is operated, for a purpose as will be described.

The third circuit controller may be arranged to simultaneously control a plurality of signals in the system and is associated with the foot brake lever so as to be capable of being operated independently of or conjointly with said brake lever, for a purpose as will be described.

The signals employed in the system may be of any desired construction, and preferably such as are capable of being seen both in the day time and at night.

These and other features of this invention will be pointed out in the claims at the end of this specification.

Figure 3:
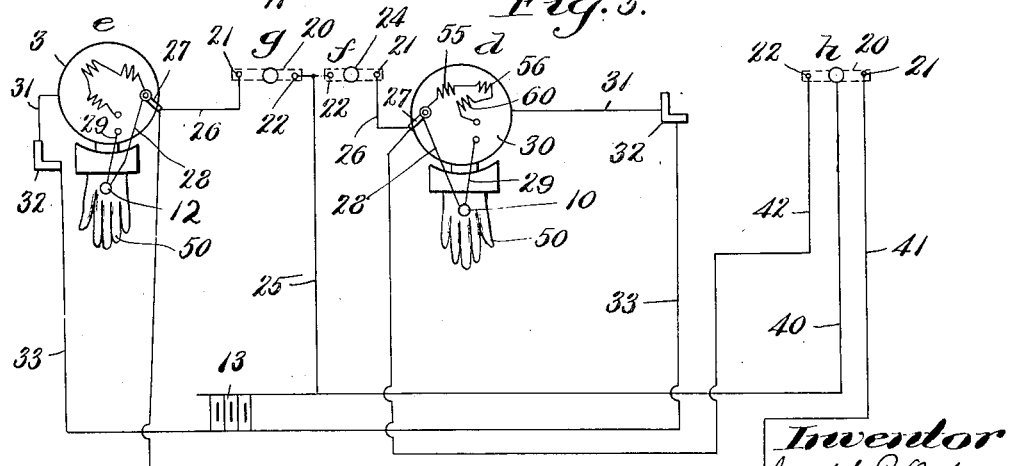

Fig. 3, a diagram of circuits to illustrate the system.

Figure 1:
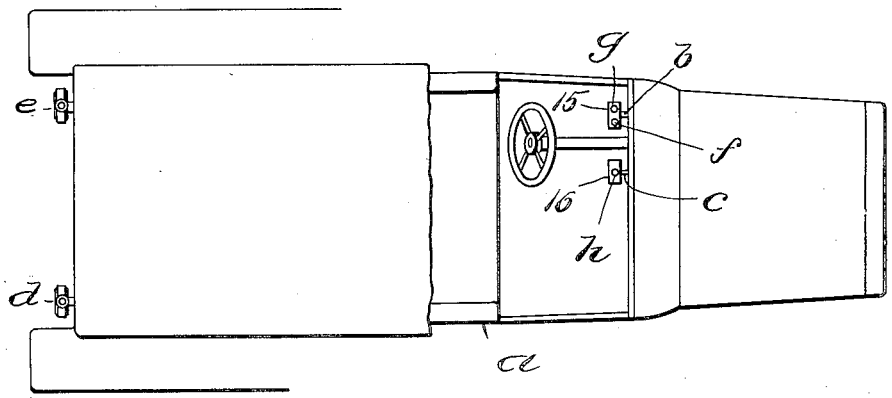
Figure 1 is a plan view of one construction of motor vehicle provided with a signaling system embodying the invention.
Figure 4:
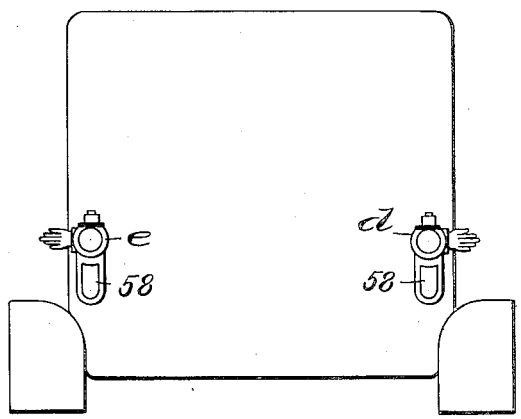

Fig. 4, a rear view of the body portion of the vehicle shown in Fig. 1 with the signals set in their operative positions.

Figure 5:
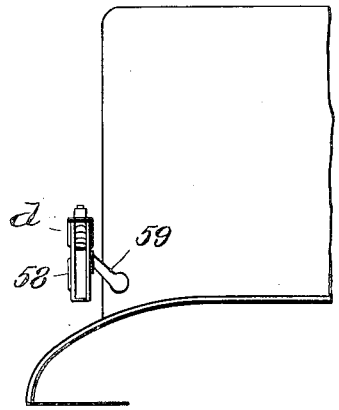

Fig. 5, a side elevation of the rear end of the body portion of the vehicle, looking toward the left in Fig. 4.

Figure 2:
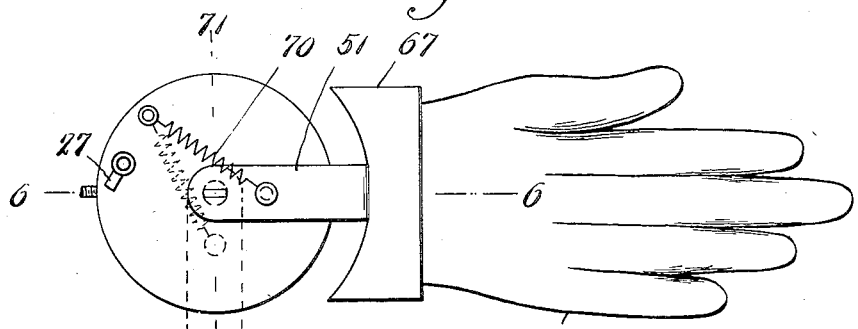
Fig. 2 is an elevation of one of the signals preferred by me.
Figure 6:
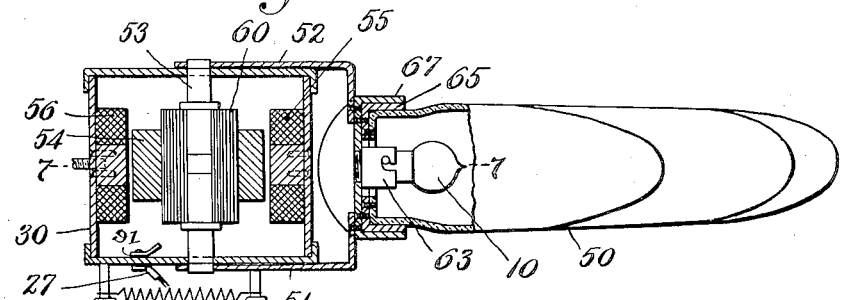

Fig. 6, a section of one of the signals shown in Fig. 1 on an enlarged scale, the section being taken on the line 6—6, Fig. 2.

Figure 7:
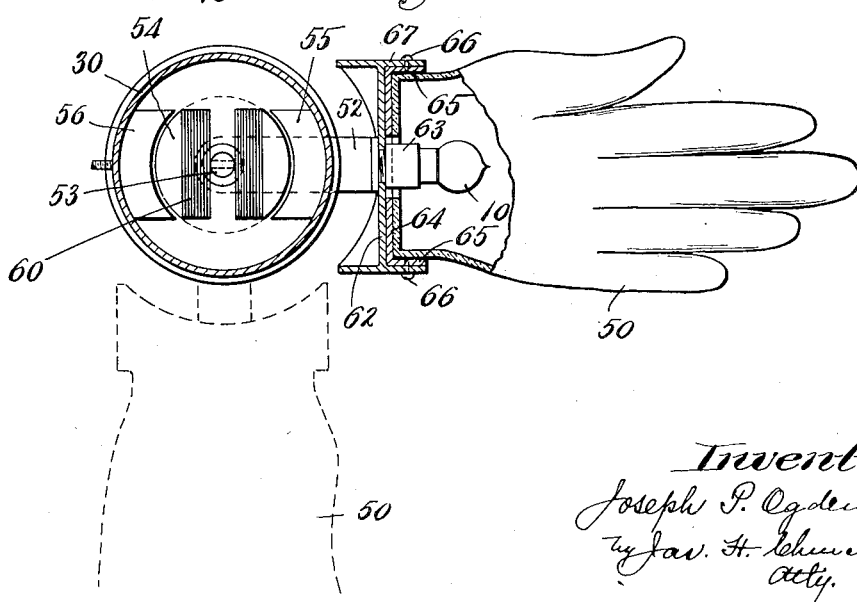

Fig. 7, a section and elevation of the signal shown in Fig. 6, the section being taken on the line 7—7.

Figure 8:
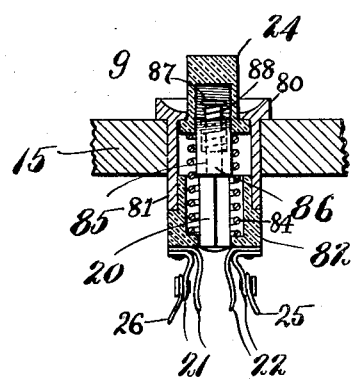
Figure 9:
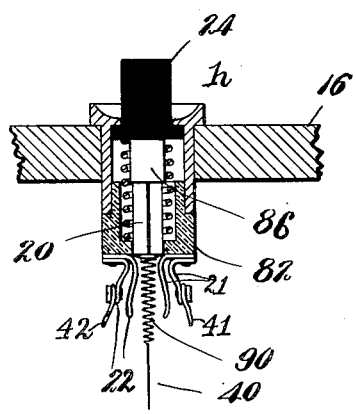

Figs. 8 and 9, details in section of the circuit controllers illustrated in Fig. 1, and Figs. 10, 11 and 12, diagrammatic views to illustrate the operation of the clutch lever and the circuit controllers carried thereby.

Referring to the drawing $a$ represents a motor vehicle of the type which has a foot operated clutch lever $b$ and a foot operated brake lever $c$, such as are now commonly employed in motor vehicles driven by an internal combustion motor. The motor vehicle $a$ is provided with an electric signaling system for indicating the intention of the operator of the vehicle with respect to the movement of the vehicle. The signaling system is provided with a plurality of signals to indicate movement of the vehicle to the right and left and which may be located at any desired part of the vehicle, and in the present instance I have illustrated two signals $d$, $e$, which are located at the rear of the vehicle, and are controlled by the foot of the operator of the car.

The signals $d$, $e$, are electrically operated and may be of any suitable or desired construction capable of being illuminated to indicate the intention of the operator of the vehicle with respect to the movement of the vehicle, particularly at night. To this end, the signals $d$, $e$, are provided with incandescent lamps 10, 12, see Fig. 3, which are included in circuit with a suitable source of current carried by the vehicle, such as the storage battery 13, now commonly employed for supplying current for the lighting and magneto systems commonly employed on motor vehicles provided with internal combustion motors.

The circuits including the lamps 10, 12, are provided with a plurality of circuit controllers $f$, $g$, $h$, which in accordance with this invention are associated with the clutch lever $b$ and foot brake lever $c$ in such manner as to permit the circuit controllers to be operated by the foot of the operator without operating the said levers, and so as to necessitate the operation of the circuit controllers when the said levers are operated.

The signals $d$ and $e$ are herein represented as located at the rear of the vehicle near the opposite sides of the same, see Fig. 4, and are designed to be operated individually to indicate that the vehicle is about to turn to the right or left. For instance, if the driver of the vehicle is about to turn to the right, the signal $d$ is operated, and if to the left, the signal $e$ is operated. If the driver is about to stop the vehicle both signals are operated.

To accomplish these results and leave the hands of the operator free to manipulate the steering wheel, the gas or spark levers, the emergency brake, or the gear shifting lever, or do any other work requiring the use of the hands, the circuit controllers for the electric signals 10, 12, are placed under the control of the foot of the operator, and for the best results two of the circuit controllers as $f$, $g$, are located on the plate 15 forming part of the clutch lever $b$ and the third circuit controller $h$ is located on the plate 16 of the foot brake lever $c$.

These circuit controllers are arranged on the plates 15, 16, so as to be capable of being engaged and operated by the foot of the driver or chauffeur without operating the levers $b$, $c$, and to this end, the movable members of the circuit controllers are preferably arranged to project above the face plates 15, 16.

The circuit controllers $f$, $g$, which are applied to the clutch lever $b$ may be of the push button or of any other suitable type, and in Fig. 3, they are conventionally represented, wherein 20 represents the movable member which coöperates with stationary members or circuit terminals 21, 22. The member 20 may be located behind the face plate 15 of the clutch lever and has attached to it a button 24, which projects above the face plate a sufficient distance to be engaged by the foot of the operator, so that the latter may press upon the button 24 and move the member 20 into contact with the terminals 21, 22, without moving the clutch lever $b$. In Fig. 8, I have illustrated in section a push button construction of the circuit controller $f$, with which satisfactory results have been obtained. In the construction shown in Fig. 8, the button 24 of insulating material extends through an opening in the head 80 of a metal sleeve 81 which is extended through a hole in the face plate 15 and has secured to it a sleeve 82 of insulating material, to which are secured spring metal plates or fingers which constitute the circuit terminals of contact members 21, 22. The movable member 20 is shown as a metal rod or spindle, which is operatively connected with the button 24, so that when the latter is pressed upon, the metal rod 20 will be engaged with the spring fingers or terminals 21, 22. The button 24 is returned to its normal position above the face plate by a spring 84 bearing at one end against the button 24 and at its other end against the stationary sleeve 82. The metal rod or spindle 20 has a reduced portion 85, which extends through a metal sleeve 86 attached to the button 24, and the reduced portion 85 has a head 87, which is engaged by a spring 88 to keep the lower part of the spindle 20 normally in contact with the metal sleeve 86, so that the spindle 20 moves as one piece with the button when the latter is depressed to close the circuit and so as to permit the spring 84 to move the button independently of the spindle 20 until the sleeve 86 engages the head 87 on the spindle, whereupon the spindle moves with the button to open the circuit. The circuit controllers $g$ and $h$ are and may be of similar construction.

The circuit controller $f$ governs the circuit of the lamp 10, which may be traced in Fig. 3, as follows: from the battery 13 by wire 25, to terminal 22, thence by member 20 to terminal 21, thence by wire 26, terminal 27, wire 28 to lamp 10, thence by wire 29, metal case 30, wire 31, to metal frame 32 of vehicle, thence by wire 33 back to battery 13.

The controller $g$ governs the circuit of lamp 12, which may be traced as follows in Fig. 3: from the battery 13 by wire 25 to terminal 22 of controller, thence by member ber 20, terminal 21, wire 26, terminal 27, wire 28, lamp 12, wire 29, case 30, wire 31, frame 32 and wire 33 back to battery 13.

Figures 10, 11, 12:
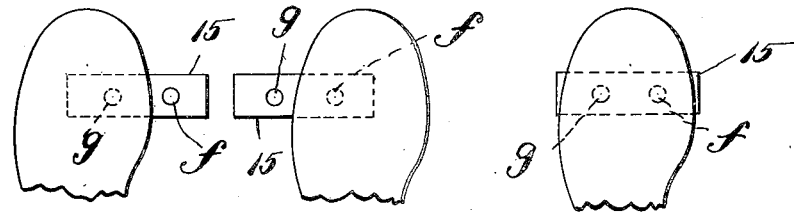

It will thus be seen, that the signal 10 alone may be operated to indicate that the vehicle is about to turn to the right, by the chauffeur pressing his foot on the button 24 of circuit controller $f$, as represented in Fig. 10, and that the signal 12 alone may be operated to indicate that the vehicle is about to turn to the left, by pressing the foot on the button of the circuit controller $g$, as represented in Fig. 11, and that each signal may be operated independently of the other and without necessitating operation of the clutch lever. It is desirable however, that both signals should be operated when the clutch lever is operated, and to accomplish this result, the circuit controllers $f$, $g$, are located in sufficiently close proximity to each other on the plate 15 to enable the distance between them to be spanned by the foot of the operator as represented in Fig. 12, when the latter applies his foot solidly or as it may be termed centrally to the face plate 15 of the clutch lever $b$ to throw out the clutch. It will thus be seen, that when the foot is applied firmly or centrally to the clutch lever to throw out the clutch, as when it is desired to stop the vehicle, both signals 10, 12, will be operated and serve to indicate that the vehicle is being stopped.

It is also highly desirable to operate both signals when the foot brake lever 16 is operated to stop the vehicle, and to this end the circuit controller $h$ is used with the brake lever $c$ and is connected with both signals, for which purpose, the movable member 20 is connected by wire 40 with one side of the battery 13, and the terminal 21 is connected by wire 41 with the lamp 12 of the signal $e$, and the terminal 22 of controller $h$ is connected by wire 42 with the lamp 10 of signal $d$. The wire 40, as shown in Fig. 9 has its end which is connected with the movable member 20, made in the form of a coil 90, which is soldered or otherwise affixed to the member 20 and constitutes a flexible connection which permits the member 20 to be moved without danger of breaking the connection. The circuit of the lamp 10 may be traced in Fig. 3 as follows: from battery 13 by wire 40 to movable member 20 of controller $h$, thence by terminal 22, wire 42, terminal 27, wire 28, lamp 10, wire 29, case 30, wire 31, frame 32 and wire 33 back to battery 13.

The circuit of lamp 12 may be traced as follows: from battery 13 by wire 40, member 20 of controller $h$, terminal 21, wire 41, terminal 27, wire 28, lamp 12, wire 29, case 30, wire 31, frame 32 and wire 33 back to battery. It will thus be seen, that when the foot brake lever is operated to apply the foot brake, either to stop or slow down the vehicle, both signals will be operated to indicate this intention on the part of the chauffeur. Some drivers of motor vehicles when slowing down slip the clutch, in which case both signals will be operated, and this intention made known, whereas other drivers do not slip the clutch but prefer to apply the foot brake more or less gently, in which case both signals are operated.

From the above description, it will be seen that the invention is not limited to any particular construction of signal, but may be used with any which depends for its operation upon the use of circuit controllers.

In the present instance I have illustrated one construction of signal which I may prefer, inasmuch as it approximates the movement of the hand of the chauffeur as now used for giving signals in the day time.

The signal preferred by me and herein shown consists of a hand 50 preferably hollow and of translucent or transparent material, and said hand is detachably secured to an oscillating frame comprising two side bars 51, 52, which are mounted on the opposite ends of the shaft 53 of the armature 54 of a motor having its field coils 55, 56, located in the metal case 30, which is located within an outside casing 58 attached to the vehicle as for instance by brackets or arms 59, which may be metal pipes, see Figs. 1 and 5. The armature 54 is provided with a winding 60, which is connected in series with the field coils 55, 56, and has one end connected with the metal case 30, which is grounded through the outside casing 58 and bracket 59 with the frame 32 of the vehicle.

One end of one field coil as 55 is connected with the terminal 27, see Fig. 3, which is insulated from the case 30 as represented by the heavy black lines 91 in Fig. 6. The swing arms 51, 52 have secured to them a metal bar 62, see Fig. 7, carrying a socket 63 for the lamp 10 or 12, and the hollow hand 50 is secured to a metal bar 64 provided with end flanges 65, by means of which the said hand may be detachably secured as by screws 66 to a flange 67 on the bar 62. The hollow hand 50 is designed to normally hang in a vertical position within the outer casing 58 and to be swung up into a substantially horizontal position shown in Figs. 1 and 2 through a suitable opening in the casing 58, by movement of the armature 54 when the circuit of the motor is closed.

The hand 50 is maintained in its operative position by the motor assisted by a spring 70, see Fig. 2, which has one end connected with the swing arm 51 and its other end connected with the case 30 on one side of a vertical plane through the armature shaft 53 and through the hand 50 with the latter in its lowered position, which plane is indicated by the dotted line 71 in Fig. 2. The hollow hand 50 returns to its vertical or inoperative position by gravity, and gravity is assisted in keeping the hand in its lowered position by the spring 70. It will be understood that the circuit of the motor 54, 55, 56, is governed by the circuit controllers $f$, $g$ and $h$ in the same manner as above described with relation to the lamps 10, 12, and that when the said circuit controllers are closed as above described, the hands 50 are individually and collectively operated. The motor for operating the hand which carries the lamp 10 is in multiple with the lamp and may be traced in Fig. 3 from the terminal 27 through the field coils 55, 56 and the armature coil 60 to the case 30. The motor for operating the hand carrying the lamp 12 is in multiple with the lamp 12 as shown in Fig. 3. It will thus be seen that in the present instance, a movable signal and an illuminating signal are both governed by the circuit controllers on the foot levers. The particular construction of signal herein shown is not herein claimed.

I have herein shown the vehicle as provided with signals located at the rear of the same, but it is not desired to limit the invention in this respect or to the particular kind of electric signal herein shown.

The circuit controllers for the signaling system are herein shown as associated with a device for controlling movement of the vehicle, which device is herein shown as a foot operated lever, and while it is preferred to associate the circuit controller with a foot operated device for the reasons above stated, it is not desired to limit the invention in this respect.

Claims:

1. The combination with a motor vehicle provided with a foot operated clutch lever and with a foot operated brake lever, of an electric signaling system carried by said vehicle and having signals for indicating direction of movement and stopping of said vehicle, and provided with a plurality of circuit controllers governing said system and associated with said clutch and brake levers to be individually operated by a foot of the operator of the vehicle independently of said levers and to be necessarily and collectively operated therewith when either or both of said clutch and brake levers is or are operated.

2. The combination with a motor vehicle provided with a foot operated clutch lever, of an electric signaling system carried by said vehicle and having signals for indicating movement of the vehicle to the right and left and provided with a plurality of circuit controllers governing said system and associated with said clutch lever to be actuated individually to operate said signals individually and to be actuated collectively to operate said signals collectively when the said clutch lever is actuated to throw out the clutch of the said vehicle.

3. The combination with a motor vehicle provided with mechanism actuated by the foot of the operator of said vehicle, of an electric signaling system carried by said vehicle and having signals for indicating movement of the vehicle to the right and left and provided with a plurality of circuit controllers governing said system and associated with said mechanism to be operated individually or collectively by direct application of the foot of the operator in the same direction the foot is moved to operate said mechanism.

4. The combination with a motor vehicle provided with a device for controlling movement of said vehicle, of an electrical signaling system provided with signals for indicating movement of the vehicle to the right and left and having a plurality of circuit controllers governing the circuits of said signals and associated with said controlling device so as to be necessarily operated collectively when said controlling device is operated and so as to be operated individually and independently of said controlling device at the will of the operator and by the same member of the operator which effects movement of the controlling device.

In testimony whereof, I have signed my name to this specification.

JOSEPH P. OGDEN.